United States Patent
Hsu et al.

(10) Patent No.: US 8,993,685 B2
(45) Date of Patent: Mar. 31, 2015

(54) METHOD FOR HYDROGENATING POLYMER AND HYDROGENATED POLYMER THEREOF

(71) Applicant: TSRC Corporation, Taipei (TW)

(72) Inventors: Chih-Wei Hsu, Kaohsiung (TW); Hung-Chieh Hou, Pingtung (TW); Man Yin Lo, Zhubei (TW)

(73) Assignee: TSRC Corporation, Taipei (TW)

( * ) Notice: Subject to any disclaimer, the term of this patent is extended or adjusted under 35 U.S.C. 154(b) by 0 days.

(21) Appl. No.: 13/665,661

(22) Filed: Oct. 31, 2012

(65) Prior Publication Data

US 2014/0066578 A1    Mar. 6, 2014

(30) Foreign Application Priority Data

Aug. 31, 2012    (TW) .............................. 101131887 A

(51) Int. Cl.
| | | |
|---|---|---|
| C08C 19/02 | (2006.01) | |
| C08F 8/04 | (2006.01) | |
| B01J 23/46 | (2006.01) | |
| B01J 23/06 | (2006.01) | |
| C08F 112/08 | (2006.01) | |
| C08F 297/04 | (2006.01) | |

(52) U.S. Cl.
CPC ................. C08F 297/04 (2013.01); C08F 8/04 (2013.01); C08F 112/08 (2013.01); C08F 2800/20 (2013.01)
USPC ...................... 525/339; 525/332.9; 525/333.3; 525/338

(58) Field of Classification Search
CPC .......... C08C 19/02; C08F 8/04; B01J 23/462; B01J 2231/641; B01J 2231/645; B01J 2523/821
USPC .............................. 525/338, 339, 332.9, 333.3
See application file for complete search history.

(56) References Cited

U.S. PATENT DOCUMENTS

| | | |
|---|---|---|
| 6,841,626 B1 | 1/2005 | Wege et al. |
| 7,355,084 B2 | 4/2008 | Böttcher et al. |
| 2011/0098412 A1* | 4/2011 | Hou .............................. 525/289 |

FOREIGN PATENT DOCUMENTS

| | | |
|---|---|---|
| JP | 54-094491 A | 7/1979 |
| JP | 07-268364 A | 10/1995 |
| JP | 2007-105604 A | 4/2007 |
| JP | 2011-057981 A | 3/2011 |
| KR | 10-2011-0023827 A | 3/2011 |
| TW | 201107358 A1 | 3/2011 |

OTHER PUBLICATIONS

Haifeng et al., Prepr. Pap. Am. Chem. Soc., Div. Pet. Chem. 50 (2005) 121-122.*
Haifeng, Xie et al., "Preparation of Amorphous Ru—Zn—B/AL2O3 Catalyst and its Application in Benzene Selective Hydrogenation," Prepr. Pap.-Am. Chem. Soc., Div. Pet. Chem. 2005, 50(1), pp. 121-122, doc. No. XP008158847.
European Search Report mailed Dec. 21, 2012 in counterpart European Application No. 12193563.9.
Korean Office Action mailed Mar. 5, 2014 in counterpart Korean Application No. 10-2012-0135213.
Haije, Sun et al., Progress in Ru-Based Amorphous Alloy Catalysts for Selective Hydrogenation of Benzene to Cyclohexene, Chinese Journal of Catalysts, 2011, pp. 1-16, vol. 32, No. 1, Department of Chemistry, Zhengzhou University, Zhengzhou 450001, Henan, China.
Taiwanese Office Action mailed Mar. 8, 2014 in counterpart Taiwanese Application No. 101131887.
Japanese Office Action mailed Jul. 1, 2014 in counterpart Japanese Application No. 2012-258862.

* cited by examiner

*Primary Examiner* — Roberto Rabago
(74) *Attorney, Agent, or Firm* — Snell & Wilmer L.L.P.

(57) ABSTRACT

A method for hydrogenating a polymer containing vinyl aromatic block and the hydrogenated polymer are provided. The method includes providing a polymer having at least one vinyl aromatic block; and hydrogenating the polymer in presence of a heterogeneous catalyst on a support, wherein the heterogeneous catalyst consists essentially of Ru, Zn and B, or Ru, Zn and P.

17 Claims, 2 Drawing Sheets

METHOD FOR HYDROGENATING POLYMER AND HYDROGENATED POLYMER THEREOF

CROSS REFERENCE TO RELATED APPLICATION

This application claims the right of priority based on Taiwan Patent Application No. 101131887 entitled "METHOD FOR HYDROGENATING POLYMER AND HYDROGENATED POLYMER. THEREOF," filed on Aug. 31, 2012, which is incorporated herein by reference and assigned to the assignee herein.

FIELD OF INVENTION

The present invention relates to a method for hydrogenating polymer and a hydrogenated polymer thereof, and more particularly, to a method for hydrogenating a polymer having vinyl aromatic block in presence of a heterogeneous catalyst and a hydrogenated polymer thereof.

BACKGROUND OF THE INVENTION

Polymers having vinyl aromatic block or having conjugated diene block and vinyl aromatic block, such as polystyrene, or triblock or five-block copolymer of styrene-butadiene or styrene-isoprene, have been commercialized as adhesive, sole, polymer modifier, etc. However, since the polymer of conjugated diene or vinyl aromatic monomer contains lots of unsaturated double bonds, its structure is highly unstable and tends to oxidize under heat or exposure to ultra violet or decomposition under other malign environments. Therefore, in order to improve the structural stability, such polymers are saturated by means of hydrogenation techniques.

There are lots of patents disclosing the hydrogenation catalyst system for such polymers. Of the related technical publications, U.S. Pat. No. 5,700,878 discloses a hydrogenation process in presence of a metal catalyst (such as Pt/Rh) on a silica support, wherein the silica support has a pore diameter greater than 600 angstroms, U.S. Pat. No. 6,376,622 discloses a hydrogenation process utilizing a metal catalyst, such as Pt/Rh. U.S. Pat. No. 6,841,626 discloses a hydrogenation process in presence of a metal catalyst (such as transition metal of VIII group from the periodic table) on an alumina support, wherein the alumina support has a pore diameter greater than 1,000 angstroms. U.S. Pat. No. 7,053,156 discloses a hydrogenation process in presence of Ni metal on an alumina support, wherein the alumina support has a pore diameter greater than 100 angstroms, U.S. Pat. No. 7,265,184 discloses a hydrogenation process in presence of a metal catalyst (such as metal of Ia, Ib, IIb, VIIb, VIIb, or VIII group from the periodic table) on a calcium silicate support, wherein the calcium silicate support has a surface area larger than 30 $m^2/g$; U.S. Pat. No. 7,355,084 discloses a hydrogenation process in presence of Ru or Ru combined with transition metal of I, VII, or VIII group from the periodic table on a silicon oxide support.

Among all kinds of conventional hydrogenation processes, Pt as the catalyst has a superior effect on the hydrogenation of benzene ring, but Pt catalyst is very expensive. Therefore, there is a need to develop a catalyst system using cheaper metal.

SUMMARY OF THE INVENTION

One aspect of the present invention is to provide a method for hydrogenating a polymer having vinyl aromatic block. The method includes hydrogenating the polymer having vinyl aromatic block using a catalyst consisting essentially of Ru, Zn and B, or Ru, Zn and P.

In one embodiment, the present invention provides a polymer hydrogenation method including providing a polymer having at least one vinyl aromatic block; and hydrogenating the polymer in presence of a heterogeneous catalyst on a support, wherein the heterogeneous catalyst consists essentially of Ru, Zn and B, or Ru, Zn and P. In another embodiment, the molar ratio of Ru:Zn:B or Ru:Zn:P is 6:1:(0.3~1) and more preferably 6:1:(0.3~0.6). In a further embodiment, the support is preferably silica, alumina, carbon, or any combination thereof and based on the total weight of the heterogeneous catalyst and the support, the weight percentage of the heterogeneous catalyst is in a range of 0.5% to 30%, more preferably in a range of 0.5% to 20%, and most preferably in a range of 0.5% to 10%.

Another aspect of the present invention utilizes a catalyst containing Ru, Z and B, or Ru, Zn and P to hydrogenate a polymer having vinyl aromatic block so as to provide a hydrogenated polymer having appropriate saturation degree, in particular an aromatic group having an appropriate number of double-bonds, such as a hydrogenated polymer containing the structure of cyclohexenyl or cyclohexadienyl group. Keeping an appropriate number of double bonds on the aromatic group can not only improve the flexibility of polymer chain, but also facilitates the synthesization of polymer having polar functional group, thus greatly promoting the application value of product.

In one embodiment, the present invention provides a hydrogenated polymer, which is made by the method for hydrogenating a polymer having vinyl aromatic block described above, in another embodiment, the polymer is a copolymer of vinyl aromatic block and conjugated diene block. The hydrogenation rate of vinyl aromatic block of the hydrogenated polymer is in a range of 60% to 99% and preferably in a range of 70% to 80%; the hydrogenation rate of conjugated diene block is 95% or more. In yet another embodiment, the average weight percentage (DB %) of the hydrogenated polymer having only one double-bond and having only two double-bonds on the carbon ring is in a range of 1% to 10% and preferably in a range of 3% to 8% based on the total weight of the hydrogenated polymer.

Other aspects and various embodiments included in the present invention to solve other problems and combined with the above aspects are disclosed in the following detailed descriptions.

DETAILED DESCRIPTION OF THE INVENTION

The preferred embodiments of the present invention will now be described in greater details. Descriptions of well-known components, materials, and process techniques are omitted so as to not unnecessarily obscure the embodiments of the invention. The present invention is described with reference to the illustrative embodiments; these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

Polymerization and Hydrogenation

Figure 1:
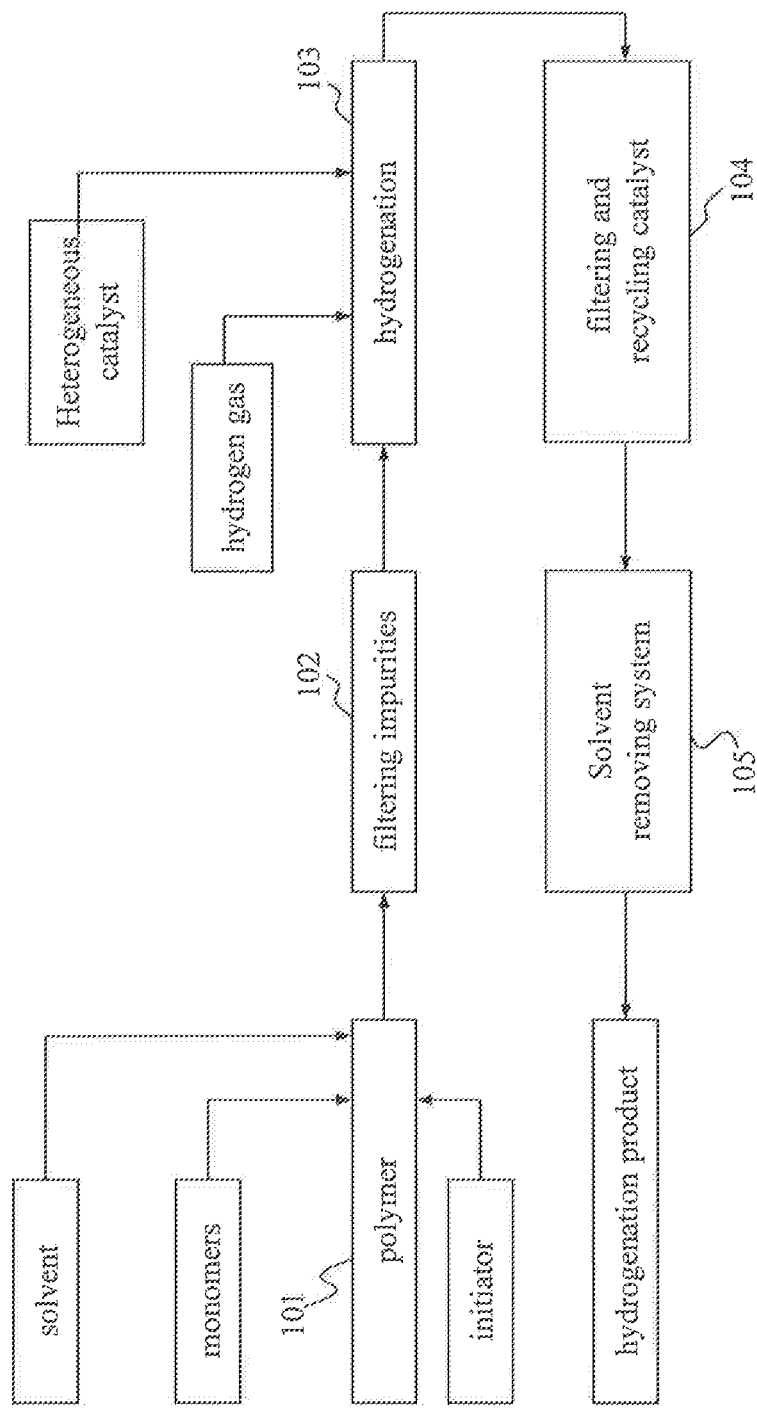
FIG. 1 illustrates a flow chart of the polymer hydrogenation method in accordance with one embodiment of the present invention.

FIG. 1 illustrates a flow chart of the polymer hydrogenation method in accordance with one embodiment of the present invention. In this embodiment, the polymer hydrogenation method includes, but is not limited to, the following steps: step 101 of executing polymerization process to form a polymer; step 102 of filtering impurities; step 103 of executing hydrogenation process; step 104 of filtering and recycling catalyst; and step 105 of removing solvent. The details of these steps will be described as illustrative examples, and the present invention is not limited thereto.

In step 101, during polymerization, the preferable option is to use organic lithium compounds as an initiator. Monomers for polymerization can be selected from any suitable monomers as required. In order to from polymer having vinyl aromatic block, monomers thereof can be independently selected from the group consisting of styrene, methylstyrene and all its isomers, ethylstyrene and all its isomers, cyclohexylstyrene, vinyl biphenyl, 1-vinyl-5-hexyl naphthalene, vinyl naphthalene, vinyl anthracene, and any combination thereof, in an example of polymer formed from only vinyl aromatic monomer (e.g., polystyrene), the weight-average molecular weight of the vinyl aromatic polymer is in a range of 5,000 to 150,000 and preferably in a range of 5,000 to 100,000. The weight-average molecular weight can be measured by means of gel permeation chromatography (GPC), which is well-known in the art.

The polymer can be a polymer containing vinyl aromatic block and conjugated diene block, wherein the vinyl aromatic monomer can be referred to those described above; the conjugated diene monomer can be independently selected from the group consisting of 1,3-butadiene, 2,3-dimethyl-1,3-butadiene, 3-butyl-1,3-octadiene, isoprene, 1-methylbutadiene, 2-phenyl-1,3-butadiene, and any combination thereof. In some embodiments, the weight-average molecular weight of the polymer is in a range of 5,000 to 400,000, preferably in a range of 5,000 to 200,000, and most preferably in a range of 20,000 to 100,000. In one embodiment, the block polymer is a triblock copolymer of vinyl aromatic block-conjugated diene block-vinyl aromatic block. In another embodiment, the block polymer is a five-block copolymer of vinyl aromatic block-conjugated diene block-vinyl aromatic block-conjugated diene block-vinyl aromatic block. In one embodiment, the weight ratio of vinyl aromatic block to conjugated diene block in the block copolymer is in a range of 5:95 to 95:5 and preferably in a range of 10:90 to 90:10.

In step 102, after polymerization, impurities can be removed.

Next, in step 103, the polymer as described above contacts and reacts with a hydrogenation agent (e.g., hydrogen gas) in presence of a heterogeneous catalyst on a support to obtain a polymer solution containing hydrogenated polymer. The heterogeneous catalyst used in this step consists essentially of three elements, which can be the combination of Ru, Zn and B, or the combination of Ru, Zn and P, wherein the molar ratio of Ru:Zn:B or Ru:Zn:P is 6:1:(0.3~1) and more preferably 6:1:(0.3~0.6). The support for hydrogenation catalyst is preferably silica, alumina, carbon, or any combination thereof. The support has a pore diameter distributed between 100 angstroms and 1000 angstroms. The pore diameter distribution can be measured by isotherm of gas adsorption and desorption, which is well known in the art. Based on the total weight of the heterogeneous catalyst and the support, the weight percentage of the heterogeneous catalyst is preferably in a range of 0.5% to 30%, more preferably in a range of 0.5% to 20%, and most preferably in a range of 0.5% to 10%. The pressure of hydrogen gas is preferably in a range of 20 to 60 the hydrogenation temperature is preferably in a range of 80° C. to 170° C.; the reaction time is preferably in a range of 20 to 500 minutes, but the present invention is not limited to the specific details described above.

The method of the embodiment proceeds to step 104; the catalyst is filtered and recycled from the polymer solution. Then, antioxidant (e.g., hindered phenolic antioxidant) can be added into the polymer solution. Then, the method of the embodiment proceeds to step 105; by means of flash devolatilization technique, solvent is removed from the polymer solution to obtain concentrated polymer solution under temperature of 200° C. to 300° C. and pressure of 1 Bar to 10 Bar. The weight percentage of solvent in the concentrated polymer solution is 1 wt % to 50 wt % of the total weight of the concentrated polymer solution. The solvent remained in the concentrated polymer solution can be removed by a volatilizer to obtain the hydrogenated block polymer under pressure of below 100 torr. The volatilizer can be a twin-screw extruder or a membrane vaporizer. In this embodiment, the twin-screw extruder is preferred and operates under temperature of 200° C. to 300° C. 300° C.

Hydrogenated Polymer

The hydrogenated polymer of the present invention contains at least one vinyl aromatic block and can be classified into two types. The first type contains at least one hydrogenated vinyl aromatic block and at least one hydrogenated conjugated diene block, wherein the first type is referred as a first hydrogenated polymer. The second type consists essentially of hydrogenated vinyl aromatic block; in other words, the second type substantially does not contain conjugated diene block and is referred as a second hydrogenated polymer.

First Hydrogenated Polymer

Figure 2:
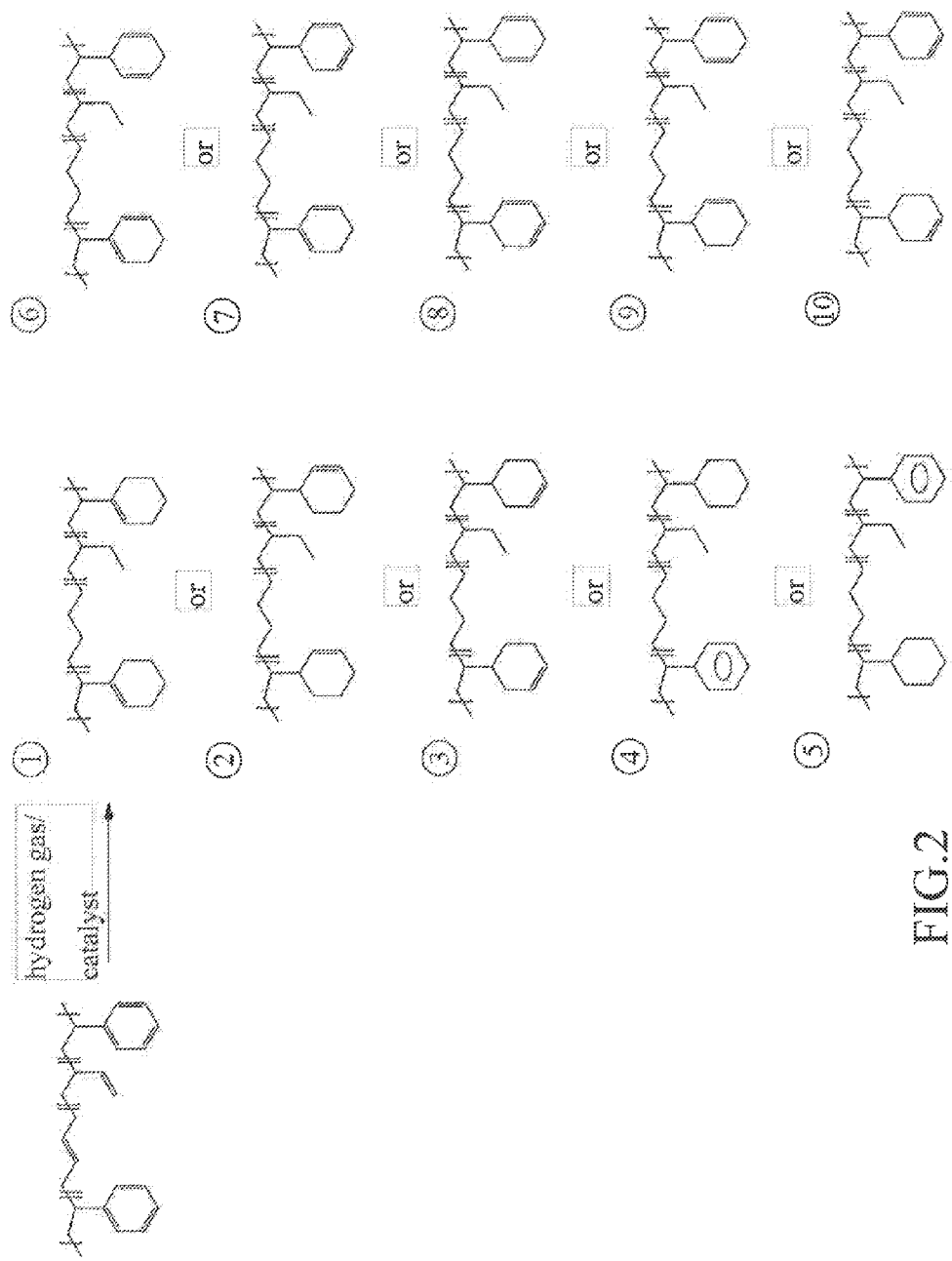
FIG. 2 illustrates an exemplary structure of the first hydrogenated polymer.

As described above, the preferred embodiment of the first hydrogenated polymer is a triblock copolymer of vinyl aromatic block-conjugated diene block-vinyl aromatic block or a five-block copolymer of vinyl aromatic block-conjugated diene block-vinyl aromatic block-conjugated diene block-vinyl aromatic block. The weight-average molecular weight (Mw) of the first hydrogenated polymer is in a range of 5,000 to 400,000, preferably in a range of 5,000 to 200,000, and most preferably in a range of 20,000 to 100,000, FIG. 2 illustrates an exemplary structure of the first hydrogenated polymer, but structures in accordance with the disclosure are not limited thereto.

The first hydrogenated polymer is characterized in that the average weight percentage (DB %) of the hydrogenated polymers having only one double-bond and having only two double-bonds on the carbon ring is in a range of 1% to 10% and preferably in a range of 3% to 8% based on the total weight of the first hydrogenated polymer. Herein, the average weight percentage of the hydrogenated polymers having one double bond and having two double bonds on vinyl aromatic block is referred as DB %. DB % can be measured by means of NMR; the method of measurement can be referred to TW99128811, which is incorporated herein by reference. In the first hydrogenated polymer of the present invention, the degree of hydrogenation of vinyl aromatic group can be controlled by process condition to achieve substantial complete hydrogenation or partial hydrogenation. The average hydrogenation rate of conjugated diene block of the first hydrogenated polymer is 95% or more. The average hydrogenation rate of vinyl aromatic block of the first hydrogenated polymer is in a range of 60% to 99% and preferably in a range of 70% to 80%. The average hydrogenation rate is measure by means of UV-VIS spectrometer, which is well known in the art.

Second Hydrogenated Polymer

The preferred embodiment of the second hydrogenated polymer is hydrogenated polystyrene. The weight-average molecular weight (Mw) of the second hydrogenated polymer is in a range of 5,000 to 150,000 and preferably in a range of 5,000 to 100,000. The weight-average molecular weight can be measured by means of gel permeation chromatography (GPC). The second hydrogenated polymer is characterized in that compared to the total weight of the second hydrogenated polymer, the aromatic group maintains an appropriate number of double-bonds, so that the average weight percentage (DB %) of the second hydrogenated polymers having only one double bond and only two double bonds on the carbon ring is in a range of 1% to 10% and preferably in a range of 3% to 8%. In this embodiment, the second hydrogenated polymer is further characterized in that the average hydrogenation rate of vinyl aromatic block of the second hydrogenated polymer is in a range of 55% to 80%, preferably in a range of 60% to 75%, and most preferably in a range of 65% to 70%.

Executing the steps described can obtain a polymer solution of about 1,294 grams, which includes a styrene-butadiene-styrene triblock copolymer having the weight-average molecular weight of 100,000. In this embodiment, styrene monomers and butadiene monomers are added at different stages. In other embodiments, styrene monomers and butadiene monomers can be added at the same time to obtain random type copolymers.

B. Partial Hydrogenation

Step 2.1: adding 200 ml of the triblock copolymer solution into an autoclave (total solid content: 12%).

Step 2.2: adding 3.0 grams of 10% $Ru_6$—$Zn_1$—$B_1/SiO_2$ catalyst.

Step 2.3: introducing nitrogen gas for 5 times, and introducing hydrogen gas for 3 times.

Step 2.4: establishing hydrogen pressure to 40 $kg/cm^2$.

Step 2.5: heating and maintaining temperature at 170° C.

Step 2.6: continuing the reaction for 288 minutes.

The hydrogenated block copolymer can be appropriately sampled and analyzed for its detail structure by means of FT-IR and H-NMR.

The process steps of Examples 2 to 5 are similar to Example 1. Table exemplarily shows analysis results of Examples 1 to 5.

TABLE I

Hydrogenated triblock copolymer of styrene-butadiene-styrene (SBS)

| Example | Catalyst Composition | Hydrogen Pressure ($Kg/cm^2$) | Reaction Time (min) | C Hydrogenation Rate (%) | S Hydrogenation Rate (%) | DB (%) | Tg (°C.) |
|---|---|---|---|---|---|---|---|
| 1 | 10% $Ru_6$—$Zn_1$—$B_1/SiO_2$ | 40 | 288 | 97 | 97.4 | 1.8 | 105 |
| 2 | 10% $Ru_6$—$Zn_1$—$B_{0.3}/SiO_2$ | 60 | 240 | 97 | 70.6 | 7.1 | 98 |
| 3 | 10% $Ru_6$—$Zn_1$—$B_1/SiO_2$ | 60 | 138 | >98 | 98.5 | 1.2 | 172 |
| 4 | 10% $Ru_6$—$Zn_1$—$B_1/SiO_2$ | 40 | 420 | >98 | 96.4 | 3.3 | 110 |
| 5 | 10% $Ru_6$—$Zn_1$—$B_1/SiO_2$ | 60 | 258 | >98 | 98.4 | 1.0 | 116 |

The preferred embodiments of the first hydrogenated polymer will be exemplarily described below by Examples 1 to 5.

Example 1

Hydrogenated Triblock Copolymer

A. Polymerization

The solvent used in the polymerization process of the embodiment is cyclohexane, wherein a small amount of tetrahydrofuran is added to adjust polarity and n-butyl lithium acts as the initiator. Monomers used in polymerization can be styrene, butadiene, or isoprene. Solvent and monomers can be purified by activated alumina. Polymerization is carried out in an autoclave equipped with an agitator. The process steps are described as following:

Step 1.1: adding 1,100 grams of cyclohexane and 4 grams of tetrahydrofuran.

Step 1.2: increasing the temperature to 50° C. by heating.

Step 1.3: adding 58.2 grams of styrene.

Step 1.4: adding 6.5 grams of an initiator to initiate reaction.

Step 1.5: continuing the reaction for 30 minutes.

Step 1.6: adding 77.6 grams of butadiene.

Step 1.7: continuing the reaction for 60 minutes.

Step 1.8: adding 58.2 grams of styrene.

Step 1.9: continuing the reaction for 30 minutes.

Step 1.10: adding 0.2 grams of methanol as a terminator to end the reaction.

In each embodiment described above, the support has an average pore diameter of 358 angstroms; the weight-average molecular weight of the polymer is 100,000; C hydrogenation rate % means the hydrogenation rate of conjugated diene block; S hydrogenation rate % means the hydrogenation rate of vinyl aromatic block.

The preferred embodiments of the second hydrogenated polymer will be exemplarily described below by Examples 6 to 8, Example 6

Hydrogenated Polystyrene

A. Polymerization

The solvent used in the polymerization process of the embodiment is cyclohexane, wherein a small amount of tetrahydrofuran is added to adjust polarity and n-butyl lithium acts as the initiator. Monomer used in polymerization is styrene. Solvent and monomers can be purified by activated alumina, Polymerization is carried out in an autoclave equipped with an agitator. The process steps are described as following:

Step 1.1: adding 1,100 grams of cyclohexane and 1 gram of tetrahydrofuran.

Step 1.2: increasing the temperature to 45° C. by heating.

Step 1.3: adding 150 grams of styrene.

Step 1.4: adding 4.61 grams of an initiator to initiate reaction.

Step 1.5: continuing the reaction for 30 minutes.

Step 1.6: adding 0.2 grams of methanol as a terminator to end the reaction.

Executing the steps described above can obtain a polymer solution of about 1,250 grams, which includes polystyrene having the weight-average molecular weight of 15,400.

B. Partial Hydrogenation

Step 2.1: adding 1,100 ml of the polystyrene solution into an autoclave (total solid content: 12%).

Step 2.2: adding 3.5 grams of 10% $Ru_6$—$Zn_1$—$P_1$/$SiO_2$ catalyst.

Step 2.3: introducing nitrogen gas for 5 times, and introducing hydrogen gas for 3 times.

Step 2.4: establishing hydrogen pressure to 40 kg/cm².

Step 2.5: heating and maintaining temperature at 170° C.

Step 2.6: continuing the reaction for 135 minutes.

The hydrogenated polymer can be appropriately sampled and analyzed for its detail structure by means of FT-IR and H-NMR.

The process steps of Examples 7 and 8 are similar to Example 6 and will not elaborate hereinafter. Table II exemplarily shows analysis results of the second hydrogenated polymer of Examples 6 to 8.

TABLE II

| | | polystyrene (PS) | | | | | |
|---|---|---|---|---|---|---|---|
| Example | Catalyst Composition | Pore Diameter (Å) | Molecular Weight | Hydrogen Pressure (Kg/cm²) | Reaction Time (min) | S Hydrogenation Rate(%) | DB (%) | Tg (° C.) |
| 6 | 10% $Ru_6$—$Zn_1$—$P_1$/$SiO_2$ | 394 | 15,400 | 60 | 135 | 65.9 | 9.2 | 105 |
| 7 | 10% $Ru_6$—$Zn_1$—$B_1$/$SiO_2$ | 358 | 100,000 | 60 | 255 | 76.1 | 6.9 | 116 |
| 8 | 10% $Ru_6$—$Zn_1$—$B_1$/$SiO_2$ | 243 | 55,000 | 60 | 210 | 57.4 | 7.3 | 110 |

S hydrogenation rate % means the hydrogenation rate of vinyl aromatic block.

The present invention also includes partially hydrogenated star block copolymer. Star block copolymer may include multiple nucleuses (i.e., polyalkenyl coupling agents) and polymer arms linked to the nucleuses. Polymer arms can include homopolymer or copolymer of conjugated diene or vinyl aromatic group. The star block copolymer can be prepared by the following steps: forming a linear block polymer having activated lithium atom in the polymer chain end; coupling the polymer chain end with a multifunctional compound to add the polymer chain on to each functional group of the multifunctional compound.

Application of Hydrogenated Copolymer in one aspect of the present invention, the hydrogenated polymer is reacted with a functional compound to provide a functionalized hydrogenated block copolymer. The specific examples of suitable functional compound include acid anhydrides, acid halides, acid amides, sulfones, oxazolines, epoxies, isocyanates, and amino group. For example, the functional compound may include carboxyl group and its derivatives, such as carboxyl group and salts thereof, ester group, amide group, and acid anhydride group. The functionalization reaction can proceed in presence of free radical initiator, wherein the free radical initiator can be peroxides or azo compounds. The functional group can be bonded to a ring of the hydrogenated block copolymer. The functionalized hydrogenated block copolymer can be used as modifier to improve the dispersity, polarity, reaction character, and heat resistance of inorganic filler in the thermoplastic resin.

While the invention has been described by way of examples and in terms of preferred embodiments, it would be apparent to those skilled in the art to make various equivalent replacements, amendments and modifications in view of specification of the invention. Therefore, the scope of the appended claims should be accorded the broadest interpretation so as to encompass all such replacements, amendments and modifications without departing from the spirit and scope of the invention.

The invention claimed is:

1. A polymer hydrogenation method, comprising:
   providing a polymer having at least one vinyl aromatic block; and
   hydrogenating the polymer in presence of a heterogeneous catalyst on a support, wherein the heterogeneous catalyst consists essentially of Ru, Zn and P.

2. The polymer hydrogenation method as claimed in claim 1, wherein the molar ratio of Ru:Zn:P is 6:1:(0.3~1).

3. The polymer hydrogenation method as claimed in claim 1, wherein the weight percentage of the heterogeneous catalyst is in a range of 0.5% to 30% based on the total weight of the heterogeneous catalyst and the support.

4. The polymer hydrogenation method as claimed in claim 1, wherein the polymer is formed from a monomer selected from the group consisting of styrene, methylstyrene and all its isomers, ethylstyrene and all its isomers, cyclohexylstyrene, vinyl biphenyl, 1-vinyl-5-hexyl naphthalene, vinyl naphthalene, vinyl anthracene, and any combination thereof.

5. The polymer hydrogenation method as claimed in claim 1, wherein the polymer further contains at least one conjugated diene block, wherein the conjugated diene block is formed from a monomer selected from the group consisting of 1,3-butadiene, 2,3-dimethyl-1,3-butadiene, 3-butyl-1,3-octadiene, isoprene, 1-methylbutadiene, 2-phenyl-1,3-butadiene, and any combination thereof.

6. The polymer hydrogenation method as claimed in claim 1, wherein the support is silica, alumina, carbon, or any combination thereof.

7. The polymer hydrogenation method as claimed in claim 1, wherein the support has a pore diameter distributed between 100 angstroms and 1,000 angstroms.

8. The polymer hydrogenation method as claimed in claim 1, wherein the weight-average molecular weight of the polymer is in a range of 5,000 to 400,000.

9. The polymer hydrogenation method as claimed in claim 1, wherein the polymer is a copolymer of vinyl aromatic block and conjugated diene block, the hydrogenation rate of vinyl aromatic block of the hydrogenated polymer obtained from the polymer hydrogenation method is in a range of 60% to 90%.

10. The polymer hydrogenation method as claimed in claim 9, wherein the hydrogenation rate of conjugated diene block of the hydrogenated polymer obtained from the polymer hydrogenation method is 95% or more.

11. The polymer hydrogenation method as claimed in claim 9, wherein based on the total weight of the hydrogenated polymer obtained from the polymer hydrogenation method, the average weight percentage of the hydrogenated polymers having only one double-bond and having only two double-bonds on the carbon ring is in a range of 1% to 10%.

12. The polymer hydrogenation method as claimed in claim 1, wherein the polymer is a vinyl aromatic block polymer, and the hydrogenation rate of vinyl aromatic block of the hydrogenated polymer obtained from the polymer hydrogenation method is in a range of 55% to 80%.

13. The polymer hydrogenation method as claimed in claim 12, wherein based on the total weight of the hydrogenated polymer obtained from the polymer hydrogenation method, the average weight percentage of the hydrogenated polymers having only one double-bond and having only two double-bonds on the carbon ring is in a range of 1% to 10%.

14. A polymer hydrogenation method, comprising:
providing a copolymer having at least one vinyl aromatic block and at least one conjugated diene block;
hydrogenating the polymer in presence of a heterogeneous catalyst on a support, wherein the heterogeneous catalyst consists essentially of Ru, Zn and B, and the molar ratio of Ru:Zn:B is 6:1:(0.3~1); and
obtaining a hydrogenated polymer wherein the hydrogenation rate of conjugated diene block is 95% or more.

15. The polymer hydrogenation method as claimed in claim 14, wherein the molar ratio of Ru:Zn:B is 6:1:(0.3~0.6).

16. The polymer hydrogenation method as claimed in claim 15, wherein the hydrogenation rate of vinyl aromatic block of the hydrogenated polymer obtained from the polymer hydrogenation method is in a range of 70% to 80%.

17. The polymer hydrogenation method as claimed in claim 14, wherein the support is silica.

* * * * *